United States Patent [19]

Fulmer et al.

[11] 4,277,234

[45] Jul. 7, 1981

[54] PERCUSSIVE FLASHCUBE ARRANGEMENT

[75] Inventors: Norman C. Fulmer, South Euclid; Norman E. Kewley, Pepper Pike, both of Ohio

[73] Assignee: General Electric Company, Schenectady, N.Y.

[21] Appl. No.: 67,266

[22] Filed: Aug. 17, 1979

Related U.S. Application Data

[63] Continuation of Ser. No. 700,139, Jun. 28, 1976, abandoned.

[51] Int. Cl.³ ............................................. F21K 5/00
[52] U.S. Cl. ................................................... 431/361
[58] Field of Search ..................... 431/361; 362/13, 14

[56] References Cited

U.S. PATENT DOCUMENTS

| 3,589,849 | 6/1971 | Sturm | 431/361 |
| 3,730,669 | 5/1973 | Shaffer | 431/361 |
| 3,918,882 | 11/1975 | Van der Laah | 431/361 |

FOREIGN PATENT DOCUMENTS 91386  5/1973  Fed. Rep. of Germany ........... 431/361

Primary Examiner—Carroll B. Dority, Jr.
Attorney, Agent, or Firm—Norman C. Fulmer; Lawrence R. Kempton

[57] ABSTRACT

A plurality of flash lamps have percussive ignition tubes mounted in a base member. Striker springs for the lamps are cocked behind posts extending from the base member, and an opening through the base member beneath each striker spring permits a trigger finger to rise from a camera through an appropriate opening and release a striker spring which then impacts against the ignition tube of a lamp and causes the lamp to flash. The base member is provided with flat-top raised ribs extending partly along the sides of the openings and between the cocked positions of the striker springs and the associated lamp ignition tubes, for guiding the travel of the striker springs.

9 Claims, 4 Drawing Figures

PERCUSSIVE FLASHCUBE ARRANGEMENT

This is a continuation of application Ser. No. 700,139, filed June 28, 1976, now abandoned.

BACKGROUND OF THE INVENTION

The invention is in the field of percussive photoflash devices, such as percussive flashcubes.

A commercially available percussive flashcube, called MagiCube, has a housing comprising a substantially flat, square base member carrying four percussively actuated flash lamps respectively near its four sides. Each of the flash lamps has a downwardly extending percussive ignition tube held in respective bores in the base member. Four striker springs are provided and are respectively held in cocked position with respect to the four ignition tubes by means of four cocking pins extending upwardly from the base member. The base member has a downwardly extending connector for insertion in a camera socket which rotates the flashcube to bring an unflashed lamp in a frontwardly facing position. Four trigger openings are provided through the base member respectively beneath the four cocked striker springs. When a flash picture is taken, a trigger finger rises from the camera and through the trigger opening associated with the frontwardly facing flash lamp and its trigger spring, and pushes the trigger spring up so that it releases over the top of its cocking pin and impacts against the ignition tube of the frontwardly facing lamp thus causing it to flash. This general arrangement is described in U.S. Pat. No. 3,730,669 to John Shaffer.

The above-referenced patent describes the desirability of having the striker springs strike the ignition tubes sufficiently high up from their lower ends to insure reliable firing of the lamps, because in manufacturing the ignition tubes it is undesirable to provide the ignition material in the lower part thereof. Thus, it is desired that the striker springs strike the ignition tubes at a point higher than that of the cocked positions of the striker springs, because the height of the latter is limited by the amount of upward travel of the camera's trigger finger. The above-referenced patent discloses a plurality of inclined ramps on the top of the base member, each located between a lamp and its associated trigger opening through the base member, so that when a striker spring is released it strikes against the ramp and rides up its inclined surface before striking the lamp's ignition tube.

SUMMARY OF THE INVENTION

Objects of the invention are to provide a new, improved, and economically feasible arrangement for causing the striker springs to strike the flash lamps' ignition tubes at a point higher than that of the cocked positions of the striker springs.

The invention comprises, briefly and in a preferred embodiment, a photoflash unit having a base member, a flash lamp having an ignition member extending above the base member, a striker member for striking the ignition member and normally held by a cocking member in cocked position away from the ignition member, a trigger opening through the base member beneath the striker member, and a raised rib carried on the top surface of the base member and extending partly along a side of the trigger opening and between the cocked position of the striker member and the ignition member of the flash lamp. When the striker member is released, it is guided to the lamp's ignition member by the top surface of the raised rib. In a flashcube, four such arrangements are provided of flash lamps, striker members, trigger openings, and raised ribs. The striker members may be held in cocked positions by pin members extending upwardly from the top surface of the base member, and are released by being pushed to the top of the pin members by means of a trigger finger of the camera. The raised ribs preferably have flat tops at the same height as the top ends of the cocking pins, and guide the striker springs in a straight, smooth, continuous motion toward the ignition members without any useless vertical motions nor intermediate impacting against an inclined ramp. Raised shoulders can be provided on the base member, integral with the ribs and at the locations of the ignition members, for aiding attachment of the ignition members to the base member.

DESCRIPTION OF THE PREFERRED EMBODIMENTS

Figure 1:
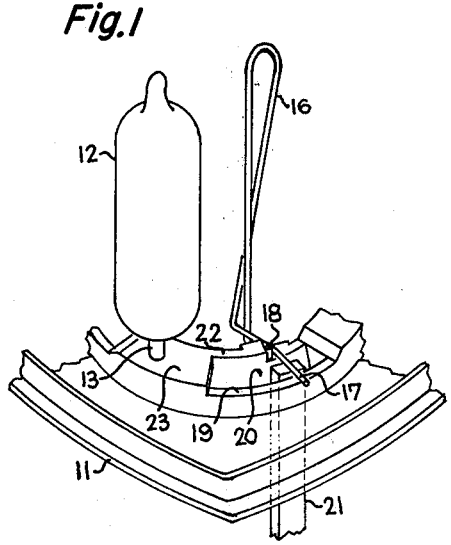
FIG. 1 is a perspective view of a portion of a flashcube utilizing an embodiment of the invention.
Figure 2:
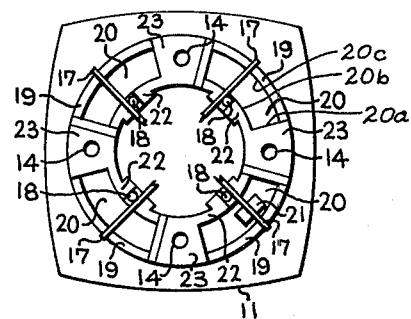
FIG. 2 is a top view of the base member of the flashcube of FIG. 1.

In the embodiment of FIGS. 1 and 2, a base member 11 of a flashcube is generally square and flat in shape, and carries a percussively ignited flash lamp 12 having an ignition tube 13 extending downwardly therefrom and into a bore 14 in the base member 11. As shown in FIG. 2, there are four bores 14 for carrying four flash lamps 12 in the flashcube. A wire striker spring 16, shaped as shown, has an end region thereof lying close to the upper surface of the base member 11 so as to form a striker member 17 resiliently urged toward the ignition tube 13 of an associated flash lamp 12. Initially, the striker member 17 is retained in cocked position behind a cocking pin 18 extending upwardly from the top surface 19 of the base member 11. The cocking pin 18 may be a metal pin held by suitable holding means such as an opening in the base member. Openings 20 are provided through the base member 11 respectively beneath the striker members 17. Each opening 20 comprises a side 20a toward the respective ignition member 13 and a pair of opposed sides 20b, 20c extending away from the respective ignition member 13. The bottom of the base member 11 is provided with a plug for attachment to a camera socket which rotates the flashcube in order to successively bring its four lamps in a position facing frontwardly of the camera, in well-known manner. When a flash picture is taken, a trigger finger 21 raises upwardly from the camera and through the opening 20 associated with the frontwardly facing lamp 12, and pushes the striker member 17 upwardly to the top of the cocking pin 18, whereby the striker member 17 releases and moves toward and impacts against the ignition tube 13 of the frontwardly facing lamp, causing the lamp to flash. The flashcube construction thus far described is well known.

In accordance with the invention, a raised rib 22 is provided, and extends upwardly from the top surface 19 of the base member 11, and extends partly alongside the inner edge of the trigger finger opening 20, and extends lengthwise from a point at or near the cocking pin 18 to a point at or near or past the ignition tube 13 of lamp 12. FIG. 2 illustrates how four such raised ribs are provided in a four-lamp flashcube. Preferably, the top surface of each rib 22 is flat and is parallel to the top surface 19 of the base member 11, and its height is approximately equal to the height of the cocking pin 18.

When a striker member 17 is released from its cocking pin 18, the top surface of the rib 22 guides it in a straight horizontal path toward the ignition tube 13 so that it strikes the ignition tube 13 at a point higher than would be the case if the rib 22 were not provided and the striker member 17, when released, would descend and ride against the top surface 19 of the base member 11. As explained above, the higher point of impact on the ignition tube 13 improves reliability of flashing the lamp, because the percussive flashing material can readily be provided within the tube 13 at this point, whereas it is not feasible to extend the percussive material into the lower end part of the ignition tube 13. The rib 22 can include and terminate at raised shoulder area 23 if desired, at the location of the bore 14 for the ignition tube 13 thereby lengthening the bore so as to hold the ignition tube 13 more securely.

The flat upper surface of the rib member 22 guides the striker member 17 to the ignition tube 13 in a smooth continuous motion without any useless vertical component of motion nor intermediate impacting.

Figure 3:
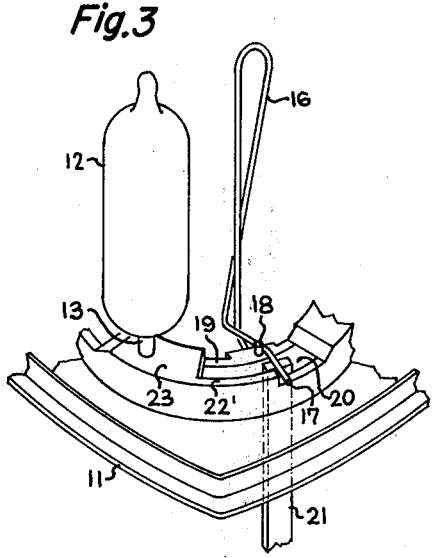
FIG. 3 is a perspective view of a portion of a flashcube utilizing an alternative embodiment of the invention.
Figure 4:
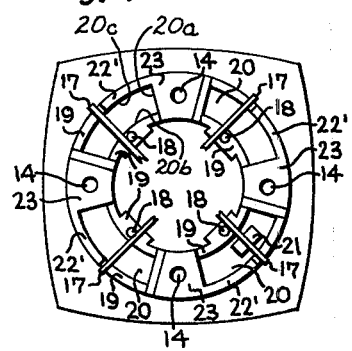
FIG. 4 is a top view of the base portion of the flashcube of FIG. 3.

The embodiment of FIGS. 3 and 4 is the same as that of FIGS. 1 and 2, except that each rib member 22' extends partly along the outside edge of a trigger opening 20, from a point approximately opposite to the location of the cocking pin 18 and near the end of the striker member 17, to a point near or past the ignition tube 13, or to the integral shoulder 23. The striker members 17 extend outwardly far enough so that upon release from the cocking pins 18, they immediately begin to ride over the top surface of the ribs 22'.

In the embodiment of FIGS. 1 and 2, the rib 22 can abut against and give added support to the cocking pin 18, and in the embodiment of FIGS. 3 and 4, the cocking pins 18 can be more readily inserted into the base member by a tool or machine.

While preferred embodiments of the invention have been shown and described, various other embodiments and modifications will be apparent to persons skilled in the art, and will fall within the scope of the invention as defined in the following claims.

What we claim as new and desire to secure by Letters Patent of the United States is:

1. A photoflash unit comprising a base member having a top surface lying substantially in a horizontal plane, a flash lamp having a percussive-type ignition member extending above said top surface of the base member, a striker member for striking said ignition member, a cocking member extending above said top surface a given distance and normally holding said striker member in a cocked position on said top surface and away from said ignition member, and a trigger opening through said base member beneath said cocked position of the striker member and comprising a side toward said ignition member and a pair of opposed sides extending away from said ignition member, said cocking member being at or near a first side of said pair of sides of the trigger opening, wherein the improvement comprises a rib extending above said top surface of the base member and partly along the second one of said pair of sides of the trigger opening, said rib having a substantially flat upper surface substantially the same height as said cocking member and extending between said ignition member and a point at or near said second side of the trigger opening which point is substantially laterally across said trigger opening from said cocking member, said striker member extending substantially laterally across and beyond said trigger opening so that when said striker member is released over the top of the said cocking member it will be guided by said rib in a substantially straight path to a point on said ignition member that is higher than said cocked position of the striker member and substantially the same height as that of said cocking member, said base member being devoid of a striker member guiding rib along said first of the pair of sides.

2. A unit as claimed in claim 1, including a bore extending into said base member from the top surface thereof, said ignition member comprising a tube held in said bore and extending upwardly from the base member, said rib including a shoulder integral therewith and extending upwardly from said base member at and around the location of said bore so as to increase the depth of said bore.

3. A unit as claimed in claim 1, in which said striker member comprises an elongated member positioned over the surface of said base member and substantially at a right angle with respect to said rib, and means attaching said elongated member to said base member at a point spaced from said rib and said trigger, said trigger opening being located between said rib and said attaching means.

4. A multiple flash lamp unit comprising a base member having a top surface area substantially lying in a horizontal plane and provided with a plurality of bores extending downwardly into said base member and symmetrically arranged on a circle about a center point of the base member, a plurality of percussively actuated flash lamps having ignition tubes respectively depending into said bores, a plurality of cocking members extending upwardly a given distance from said top surface area and arranged on a circle about said center point, each of said cocking members being offset from a respective associated bore by lying on a different radius from said center point than does the respective bore, a plurality of elongated striker members radiating outwardly on said base member and lying on said top surface area in cocked position respectively behind said cocking members from their said associated bores, and a plurality of trigger openings through said base member respectively beneath the cocked positions of said striker members, each of said trigger openings comprising a side toward the associated bore and a pair of opposed sides extending from the associated bore, each of said cocking members being at or near a first side of said pair of sides of a respective trigger opening, wherein the improvement comprises a plurality of ribs extending upwardly from said top surface area of the base member, each of said ribs having a substantially flat upper surface substantially the same height as said cocking members and extending between a respective one of said ignition tubes and a point at or near the second side of said pair of sides of the associated trigger opening which point is substantially laterally across the trigger opening from the associated cocking member, said striker members respectively extending substantially laterally across and beyond the associated trigger openings so that when the respective striker members are released over the tops of the associated cocking members they will be guided by the associated ribs in substantially straight paths to a point on the associated ignition tubes that is higher than said cocked positions of the striker members and substantially the same height as that of said cocking members, said base member being devoid of striker member guiding ribs along said first of the pair of sides of the trigger openings.

5. A unit as claimed in claim 4, in which said ribs include a plurality of shoulders respectively integral with said ribs and extending upwardly from said top surface area of the base member at the locations of said bores so as to increase the depths of said bores.

6. A unit as claimed in claim 4, in which said trigger openings are located between the radius of said ribs and said center point of the base member.

7. A base member for a multiple flash lamp unit, comprising a top surface area substantially lying in a horizontal plane and provided with a plurality of bores extending downwardly into said base member and symmetrically arranged on a circle about a center point of the base member, a plurality of means for holding a plurality of cocking members extending upwardly a given distance from said top surface area and arranged in a circle about said center point, each of said means for holding cocking members being offset from a respective associated bore by lying on a different radius from said center point than does the respective bore, and a plurality of trigger openings through said base member and respectively located on the radii of said means for holding cocking members, each of said trigger openings comprising a side toward the associated bore and a pair of opposed sides extending away from the associated bore, each of said means for holding cocking members being at or near a first side of said pair of sides of a respective trigger opening, wherein the improvement comprises a plurality of striker member guide ribs extending upwardly from said top surface area of the base member, each of said ribs having a substantially flat upper surface substantially the same height as said cocking members and extending between a respective one of said bores and a point at or near the second side of said pair of sides of the associated trigger opening which point is substantially laterally across the trigger opening from the associated means for holding a cocking member said base member being devoid of striking member guide ribs along said first of the pair of sides of the trigger openings.

8. A unit as claimed in claim 7, in which said ribs include a plurality of shoulders respectively integral with said ribs and extending upwardly from said top surface area of the base member at the locations of said bores so as to increase the depths of said bores.

9. A unit as claimed in claim 7, in which said trigger openings are located between the radius of said ribs and said center point of the base member.

* * * * *